US012764583B2

(12) United States Patent
Kim et al.

(10) Patent No.: US 12,764,583 B2
(45) Date of Patent: Oct. 13, 2026

(54) METHOD AND APPARATUS FOR OPERATIONS BASED ON REMAINING SERVICE TIME IN A WIRELESS COMMUNICATION SYSTEM

(71) Applicant: LG Electronics Inc., Seoul (KR)

(72) Inventors: Sangwon Kim, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 266 days.

(21) Appl. No.: 18/580,055

(22) PCT Filed: Aug. 4, 2022

(86) PCT No.: PCT/KR2022/011552
§ 371 (c)(1),
(2) Date: Jan. 17, 2024

(87) PCT Pub. No.: WO2023/022413
PCT Pub. Date: Feb. 23, 2023

(65) Prior Publication Data

US 2024/0340673 A1 Oct. 10, 2024

Related U.S. Application Data

(60) Provisional application No. 63/233,312, filed on Aug. 15, 2021.

(51) Int. Cl.
*H04W 24/10* (2009.01)

(52) U.S. Cl.
CPC .................................. *H04W 24/10* (2013.01)

(58) Field of Classification Search
None
See application file for complete search history.

(56) References Cited

U.S. PATENT DOCUMENTS

2022/0070811 A1* 3/2022 Tripathi ............... H04B 7/1851
2022/0150806 A1* 5/2022 Tripathi ................ H04W 48/16
2023/0047987 A1* 2/2023 Tseng .................... H04W 36/08
2023/0308924 A1* 9/2023 Fan ....................... H04W 24/10
(Continued)

FOREIGN PATENT DOCUMENTS

CN 113490246 A * 10/2021 ............ H04W 36/18
CN 116018848 A * 4/2023 ........... H04B 7/1851
(Continued)

OTHER PUBLICATIONS

Ericsson, “Feature summary for 8.10.3.3,” R2-2106526, 3GPP TSG-RAN WG1 Meeting #114e, May 19-23, 2021, 52 pages.
(Continued)

*Primary Examiner* — Kodzovi Acolatse
(74) *Attorney, Agent, or Firm* — Fish & Richardson P.C.

(57) ABSTRACT

A method and apparatus for operations based on remaining service time in a wireless communication system is provided. A wireless device acquires information on a service time for a serving cell. A wireless device receive, from the serving cell, a measurement configuration including a first type of a measurement target and a second type of a measurement target. A wireless device determines whether to perform measurements on the second type of the measurement target, based on the information on the service time of the serving cell.

6 Claims, 15 Drawing Sheets

(56) References Cited

U.S. PATENT DOCUMENTS

| | | | | |
|---|---|---|---|---|
| 2024/0349145 | A1* | 10/2024 | Chen | H04B 7/1851 |
| 2025/0142407 | A1* | 5/2025 | Huang | H04L 5/0069 |

FOREIGN PATENT DOCUMENTS

| | | | | | |
|---|---|---|---|---|---|
| CN | 119183172 | A | * | 12/2024 | H04B 7/18519 |
| WO | WO 2020/124386 | | | 6/2020 | |
| WO | 2020/145559 | A1 | | 7/2020 | |
| WO | WO 2020/231123 | | | 11/2020 | |
| WO | WO-2021259181 | A1 | * | 12/2021 | H04W 36/32 |
| WO | WO-2022045867 | A1 | * | 3/2022 | H04W 56/0045 |
| WO | WO-2022134037 | A1 | * | 6/2022 | H04B 7/18513 |

OTHER PUBLICATIONS

Extended European Search Report in European Appln. No. 22858651.7, mailed on Jun. 12, 2025, 13 pages.

LG Electronics Inc., "Cell reselection based on time and location condition," R2-2105786, 3GPP TSG-RAN WG2 Meeting #114-e, Online, May 19-27, 2021, 6 pages.

LG Electronics Inc., "Remaining Issues in NTN idle mode," R2-2107845, 3GPP TSG-RAN WG2 Meeting #115-e, Online, Aug. 16-27, 2021, 6 pages.

International Search Report and Written Opinion in Appln. No. PCT/KR2022/011552, mailed on Nov. 4, 2022, 3 pages.

LG Electronics Inc., "Connected mode enhancements in NTN," 3GPP TSG-RAN WG2 Meeting #113bis-e, R2-2103308, Online, Apr. 12-20, 2021, 5 pages.

LG Electronics Inc., "Contents of ephemeris including beam type information," 3GPP TSG-RAN WG2 Meeting #113bis-e, R2-2103307, Online, Apr. 12-20, 2021, 5 pages.

LG Electronics, "Discussion on mobility related measurement for NR NTN," 3GPP TSG-RAN WG4 Meeting # 100-e, R4-2112680, Electronic Meeting, Aug. 16-27, 2021, 2 pages.

* cited by examiner

METHOD AND APPARATUS FOR OPERATIONS BASED ON REMAINING SERVICE TIME IN A WIRELESS COMMUNICATION SYSTEM

CROSS-REFERENCE TO RELATED APPLICATIONS

This application is a National Stage application under 35 U.S.C. § 371 of International Application No. PCT/KR2022/011552, filed on Aug. 4, 2022, which claims the benefit of U.S. Provisional Application No. 63/233,312, filed on Aug. 15, 2021. The disclosures of the prior applications are incorporated by reference in their entirety.

TECHNICAL FIELD

The present disclosure relates to a method and apparatus for operations based on remaining service time in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Thanks to the wide service coverage capabilities and reduced vulnerability of space/airborne vehicles to physical attacks and natural disasters, non-terrestrial networks (NTN) are expected to:

- foster the roll out of 5G service in un-served areas that cannot be covered by terrestrial 5G network (isolated/remote areas, on board aircrafts or vessels) and under-served areas (e.g., sub-urban/rural areas) to upgrade the performance of limited terrestrial networks in cost effective manner,
- reinforce the 5G service reliability by providing service continuity for machine-to-machine (M2M)/Internet-of-things (IoT) devices or for passengers on board moving platforms (e.g., passenger vehicles-aircraft, ships, high speed trains, bus) or ensuring service availability anywhere especially for critical communications, future railway/maritime/aeronautical communications, and to
- enable 5G network scalability by providing efficient multicast/broadcast resources for data delivery towards the network edges or even user terminal.

SUMMARY

UE could be allowed to skip the measurements on neighbour cells while the remaining service time (RST) of the serving cell is larger than a threshold.

However, though the RST of the serving cell is large enough, UE may need to measure TN cells. Thus, the UE can reselect a TN cell that can provide more robust radio link with shorter latency than the NTN cell.

Therefore, studies for operations based on remaining service time in a wireless communication system are required.

In an aspect, a method performed by a wireless device in a wireless communication system is provided. The method comprises: acquiring information on a service time for a serving cell; receiving, from the serving cell, a measurement configuration including a first type of a measurement target and a second type of a measurement target, wherein the first type of a measurement target includes (i) a Terrestrial Network (TN) cell or (ii) a frequency including one or more TN cells, and wherein the second type of a measurement target includes (i) a Non-Terrestrial Network (NTN) cell or (ii) a frequency including NTN cells only; performing measurements on the first type of the measurement target; and determining whether to perform measurements on the second type of the measurement target, based on the information on the service time of the serving cell.

In another aspect, an apparatus for implementing the above method is provided.

The present disclosure can have various advantageous effects.

According to some embodiments of the present disclosure, a wireless device could efficiently perform operations based on remaining service time.

For example, the wireless device may perform measurement and/or mobility considering the remaining service time of an NTN cell (for example, an earth fixed cell).

For example, while an UE is camping on an NTN cell, the UE can save its power by skipping the measurements on neighbour NTN cells based on the RST of the serving NTN cell. In addition, the UE can move to a TN cell by performing the measurements on neighbour TN cells regardless of the RST of the serving NTN cell.

For example, power can be saved by reducing unnecessary measurements on NTN cells. That is, if the remaining service time is sufficient, measurement may not be performed on other NTN cells.

According to some embodiments of the present disclosure, a wireless network system could provide an efficient solution for operations considering the remaining service time of an NTN cell.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
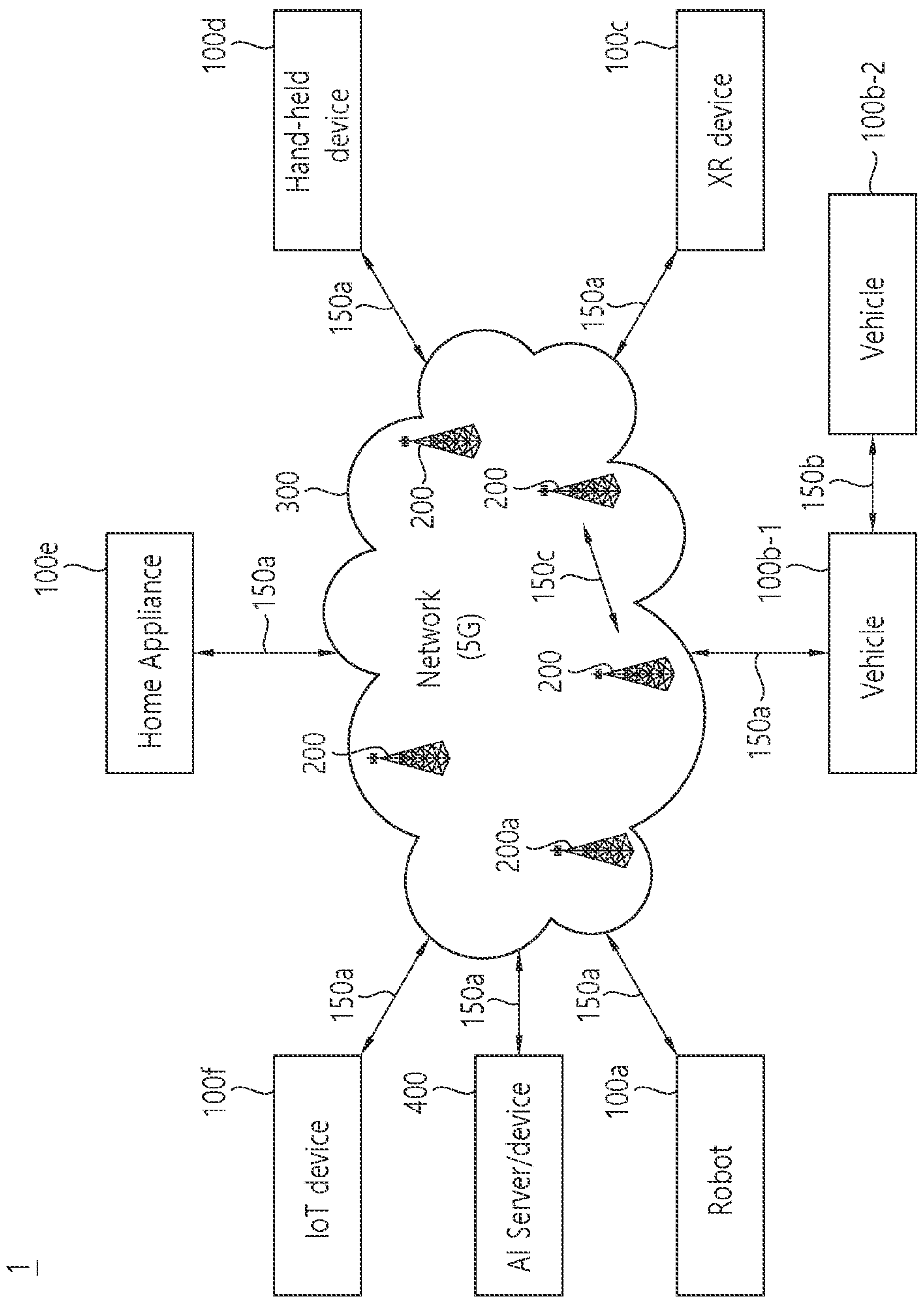
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, “A or B” may mean “only A”, “only B”, or “both A and B”. In other words, “A or B” in the present disclosure may be interpreted as “A and/or B”. For example, “A. B or C” in the present disclosure may mean “only A”, “only B”, “only C”, or “any combination of A, B and C”.

In the present disclosure, slash (/) or comma (,) may mean “and/or”. For example, “A/B” may mean “A and/or B”. Accordingly, “A/B” may mean “only A”, “only B”, or “both A and B”. For example. “A, B, C” may mean “A, B or C”.

In the present disclosure, “at least one of A and B” may mean “only A”, “only B” or “both A and B”. In addition, the expression “at least one of A or B” or “at least one of A and/or B” in the present disclosure may be interpreted as same as “at least one of A and B”.

In addition, in the present disclosure, “at least one of A, B and C” may mean “only A”, “only B”, “only C”, or “any combination of A. B and C”. In addition, “at least one of A, B or C” or “at least one of A, B and/or C” may mean “at least one of A, B and C”.

Also, parentheses used in the present disclosure may mean “for example”. In detail, when it is shown as “control information (PDCCH)”, “PDCCH” may be proposed as an example of “control information”. In other words, “control information” in the present disclosure is not limited to “PDCCH”, and “PDCCH” may be proposed as an example of “control information”. In addition, even when shown as “control information (i.e., PDCCH)”, “PDCCH” may be proposed as an example of “control information”.

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure. 1581 Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
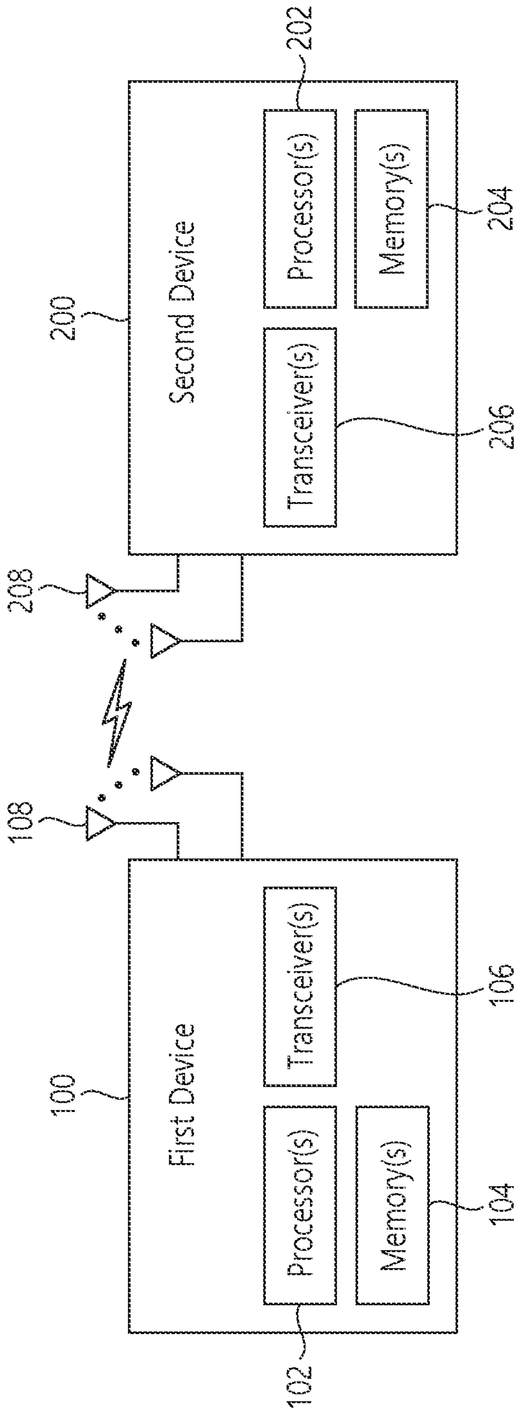
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, (the first wireless device 100 and the second wireless device 200) may correspond to at least one of (the wireless device 100*a* to 100*f* and the BS 200), {the wireless device 100*a* to 100*f* and the wireless device 100*a* to 100*f*} and/or (the BS 200 and the BS 200) of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
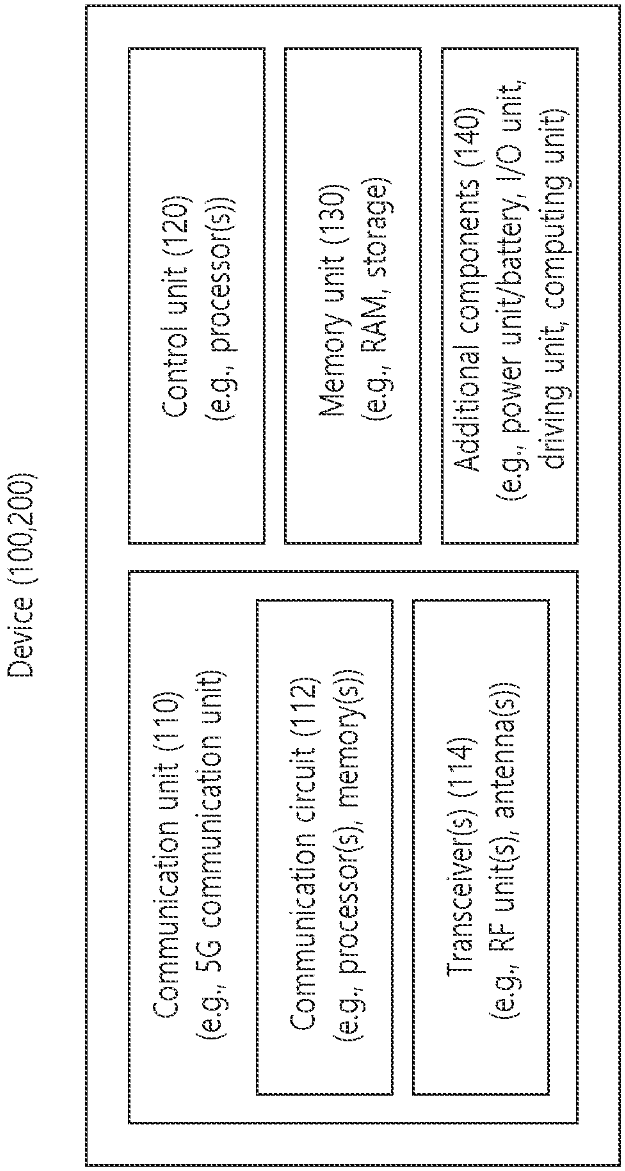
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 10 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
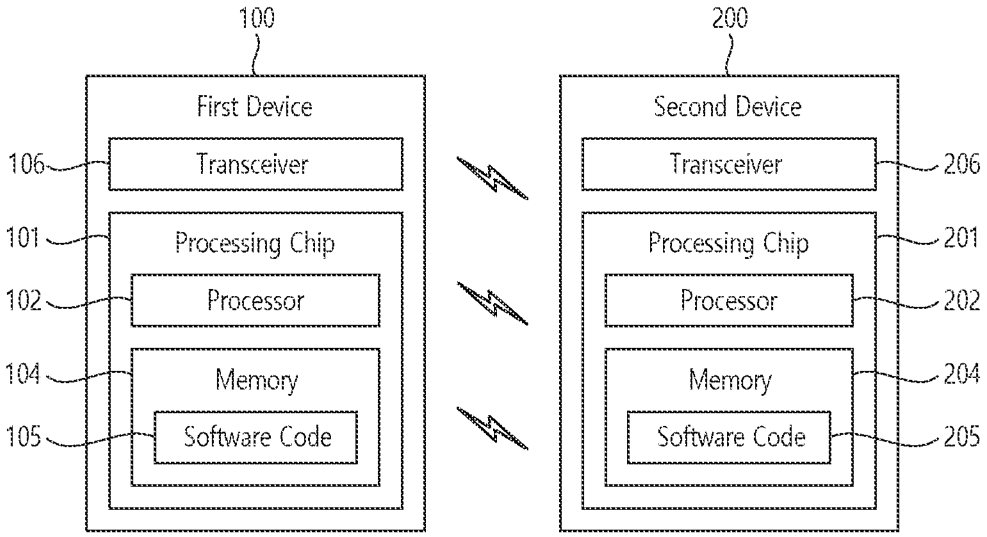
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
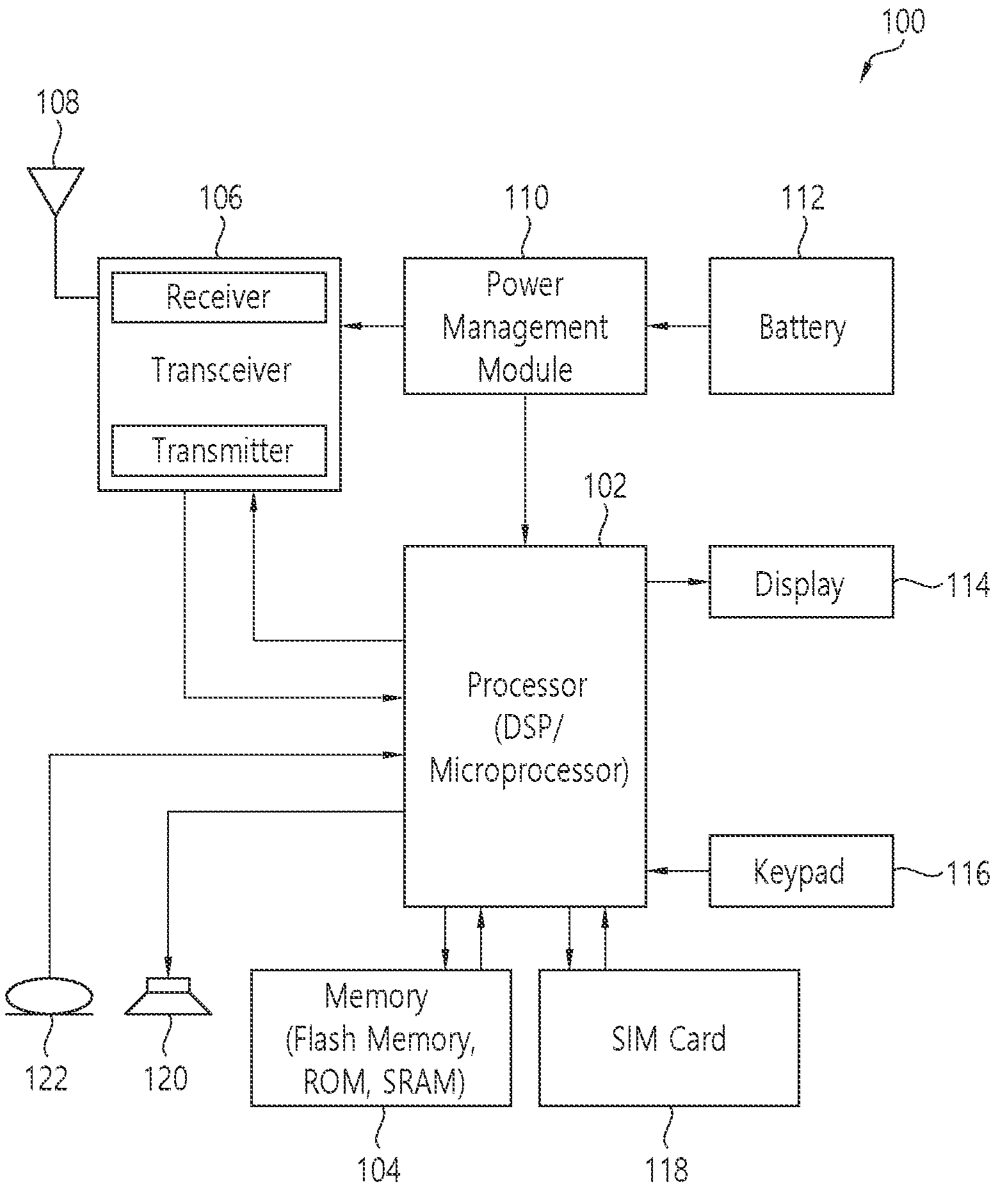
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek™, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
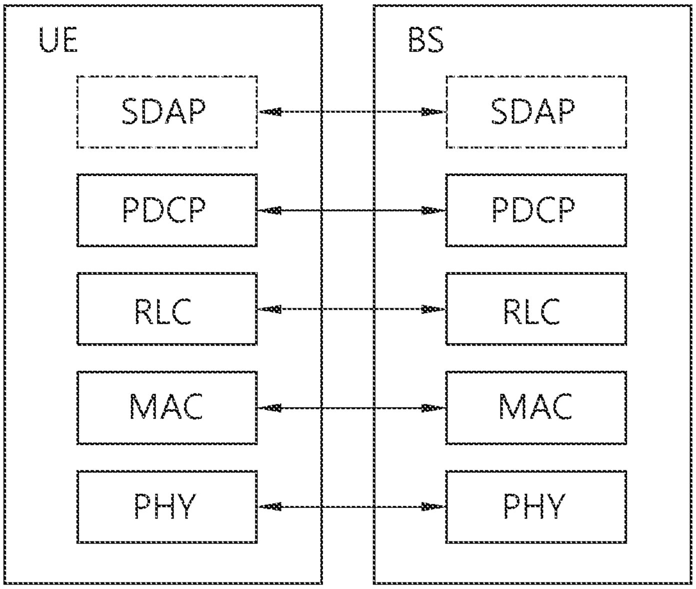
FIGS. 6 and 7 show an example of protocol stacks in a 3GPP based wireless communication system to which implementations of the present disclosure is applied.
Figure 7:
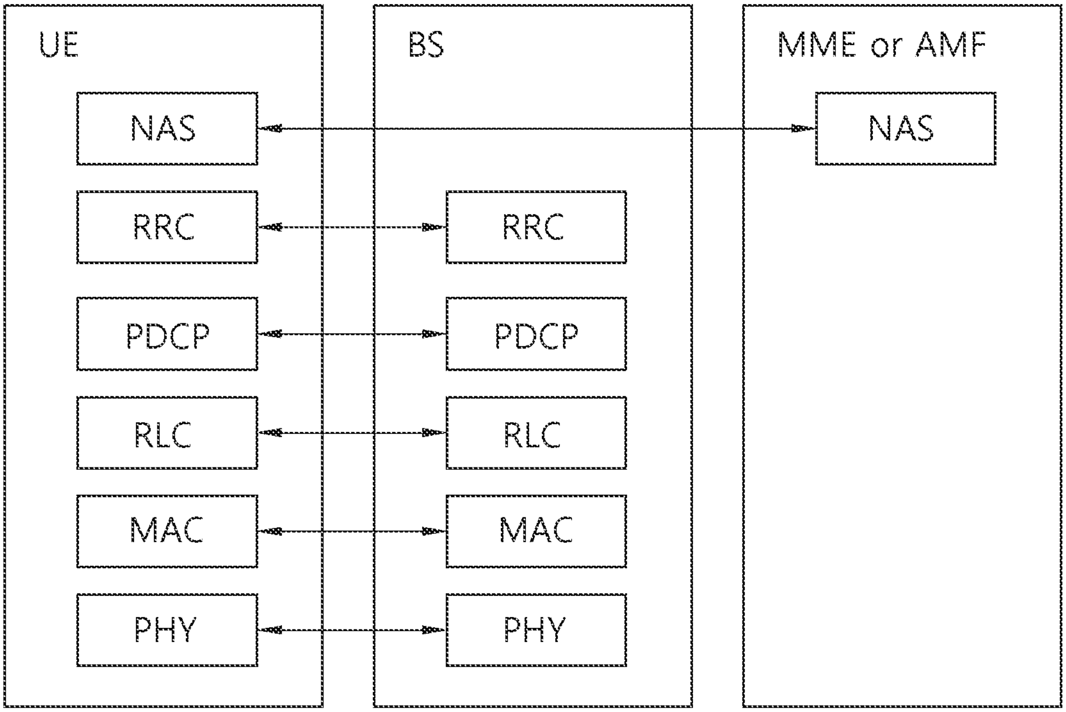

FIGS. 6 and 7 show an example of protocol stacks in a 3GPP based wireless communication system to which implementations of the present disclosure is applied.

In particular. FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels: multiplexing/de-multiplexing of MAC SDUs belonging to one or different logical channels into/from transport blocks (TB) delivered to/from the physical layer on transport channels; scheduling information reporting: error correction through hybrid automatic repeat request (HARQ) (one HARQ entity per cell in case of carrier aggregation (CA)): priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM): error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include; sequence numbering: ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN: establishment, maintenance and release of an RRC connection between the UE and NG-RAN: security functions including key management; establishment, configuration, maintenance and release of signaling radio bearers (SRBs) and data radio bearers (DRBs); mobility functions (including: handover and context transfer. UE cell selection and reselection and control of cell selection and reselection, inter-RAT mobility): QoS management functions; UE measurement reporting and control of the reporting; detection of and recovery from radio link failure; NAS message transfer to/from NAS from/to UE.

Figure 8:
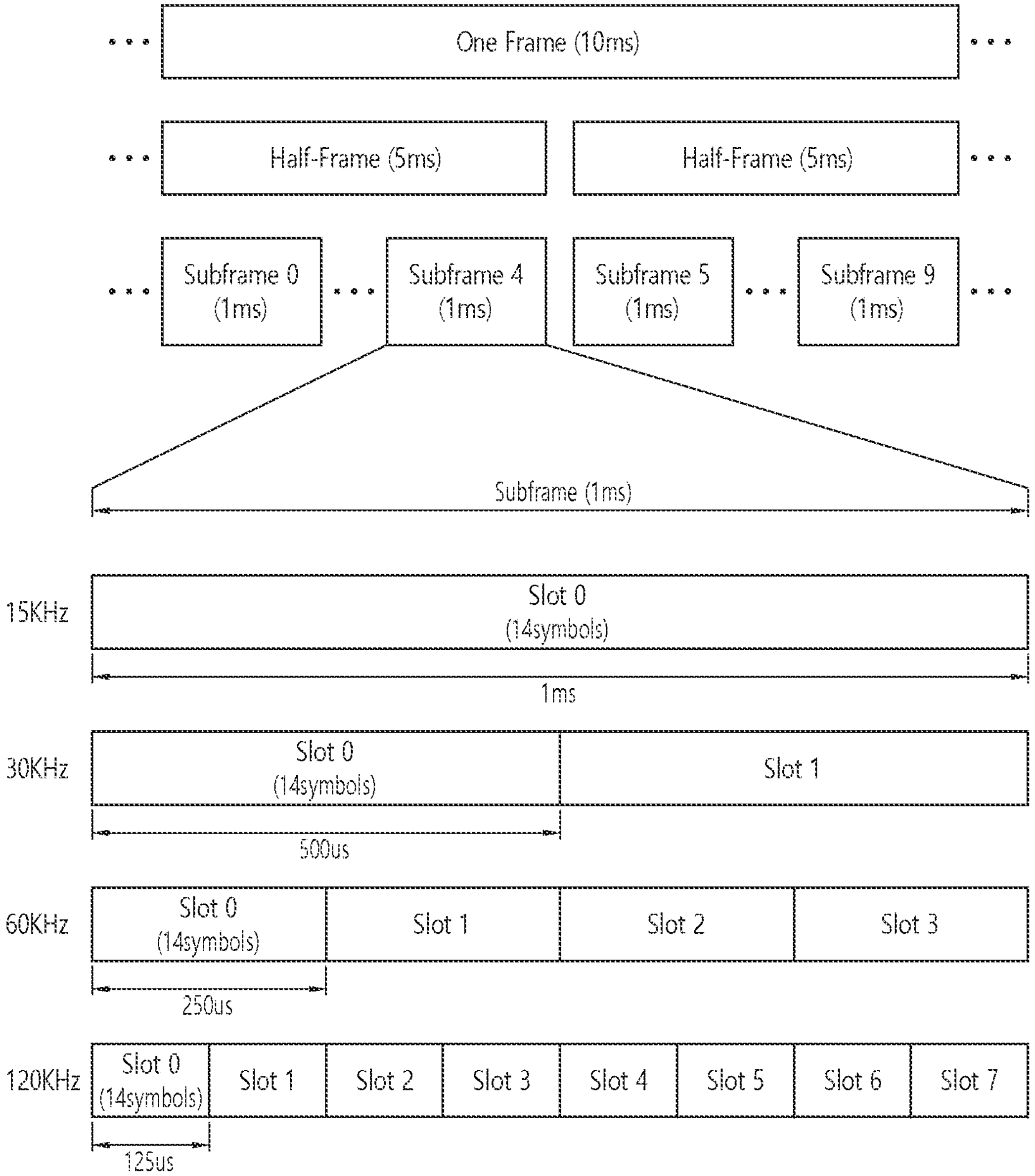
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with ‘point A’ which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range". FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
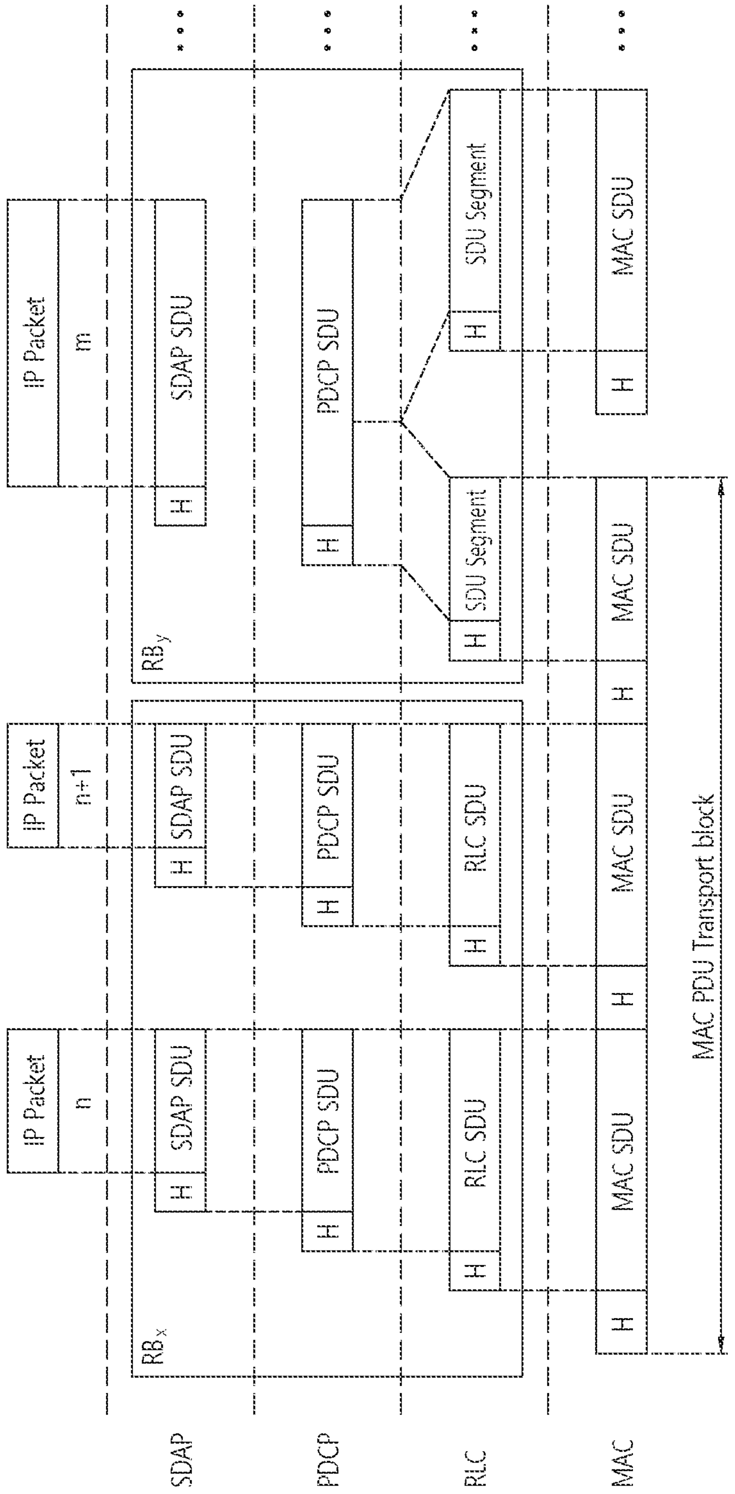
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to Non-terrestrial networks are described.

Terms related to the NTN are described.

Feeder link: Wireless link between NTN Gateway and satellite

Geostationary Earth orbit: Circular orbit at 35,786 km above the Earth's equator and following the direction of the Earth's rotation. An object in such an orbit has an orbital period equal to the Earth's rotational period and thus appears motionless, at a fixed position in the sky, to ground observers.

Low Earth Orbit: Orbit around the Earth with an altitude between 300 km, and 1500 km.

Medium Earth Orbit: region of space around the Earth above low Earth orbit and below geostationary Earth Orbit.

Minimum Elevation angle: minimum angle under which the satellite or UAS platform can be seen by a terminal.

Mobile Services: a radio-communication service between mobile and land stations, or between mobile stations Mobile Satellite Services: A radio-communication service between mobile earth stations and one or more space stations, or between space stations used by this service; or between mobile earth stations by means of one or more space stations Non-Geostationary Satellites: Satellites (LEO and MEO) orbiting around the Earth with a period that varies approximately between 1.5 hour and 10 hours. It is necessary to have a constellation of several Non-Geostationary satellites associated with handover mechanisms to ensure a service continuity.

Non-terrestrial networks: Networks, or segments of networks, using an airborne or space-borne vehicle to embark a transmission equipment relay node or base station.

NTN-gateway: an earth station or gateway is located at the surface of Earth, and providing sufficient RF power and RF sensitivity for accessing to the satellite (resp. HAPS). NTN Gateway is a transport network layer (TNL) node.

On Board processing: digital processing carried out on uplink RF signals aboard a satellite or an aerial.

On board NTN gNB: gNB implemented in the regenerative payload on board a satellite (respectively HAPS).

On ground NTN gNB: gNB of a transparent satellite (respectively HAPS) payload implemented on ground.

One-way latency: time required to propagate through a telecommunication system from a terminal to the public data network or from the public data network to the terminal. This is especially used for voice and video conference applications.

Regenerative payload: payload that transforms and amplifies an uplink RF signal before transmitting it on the downlink. The transformation of the signal refers to digital processing that may include demodulation, decoding, re-encoding, re-modulation and/or filtering.

Round Trip Delay: time required for a signal to travel from a terminal to the sat-gateway or from the sat-gateway to the terminal and back. This is especially used for web-based applications.

Satellite: a space-borne vehicle embarking a bent pipe payload or a regenerative payload telecommunication transmitter, placed into Low-Earth Orbit (LEO), Medium-Earth Orbit (MEO), or Geostationary Earth Orbit (GEO).

Satellite beam: A beam generated by an antenna on-board a satellite

Service link: Radio link between satellite and UE

Transparent payload: payload that changes the frequency carrier of the uplink RF signal, filters and amplifies it before transmitting it on the downlink Unmanned Aircraft Systems: Systems encompassing Tethered UAS (TUA), Lighter Than Air UAS (LTA), Heavier Than Air UAS (HTA), all operating in altitudes typically between 8 and 50 km including High Altitude Platforms (HAPs)

User Connectivity: capability to establish and maintain data/voice/video transfer between networks and Terminals User Throughput: data rate provided to a terminal Non-Terrestrial Networks overview A non-terrestrial network refers to a network, or segment of networks using RF resources on board a satellite (or UAS platform).

Figure 10:
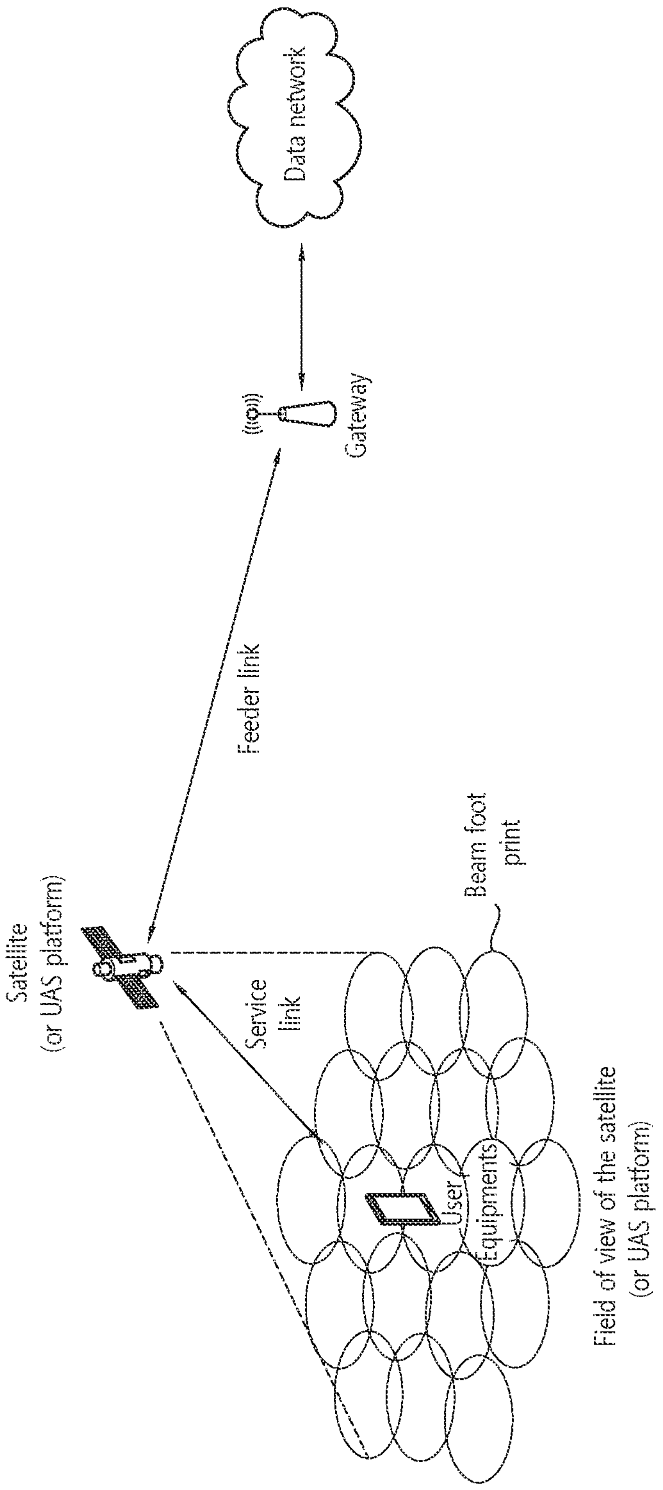
FIG. 10 shows Non-terrestrial network typical scenario based on transparent payload to which implementations of the present disclosure is applied.
Figure 11:
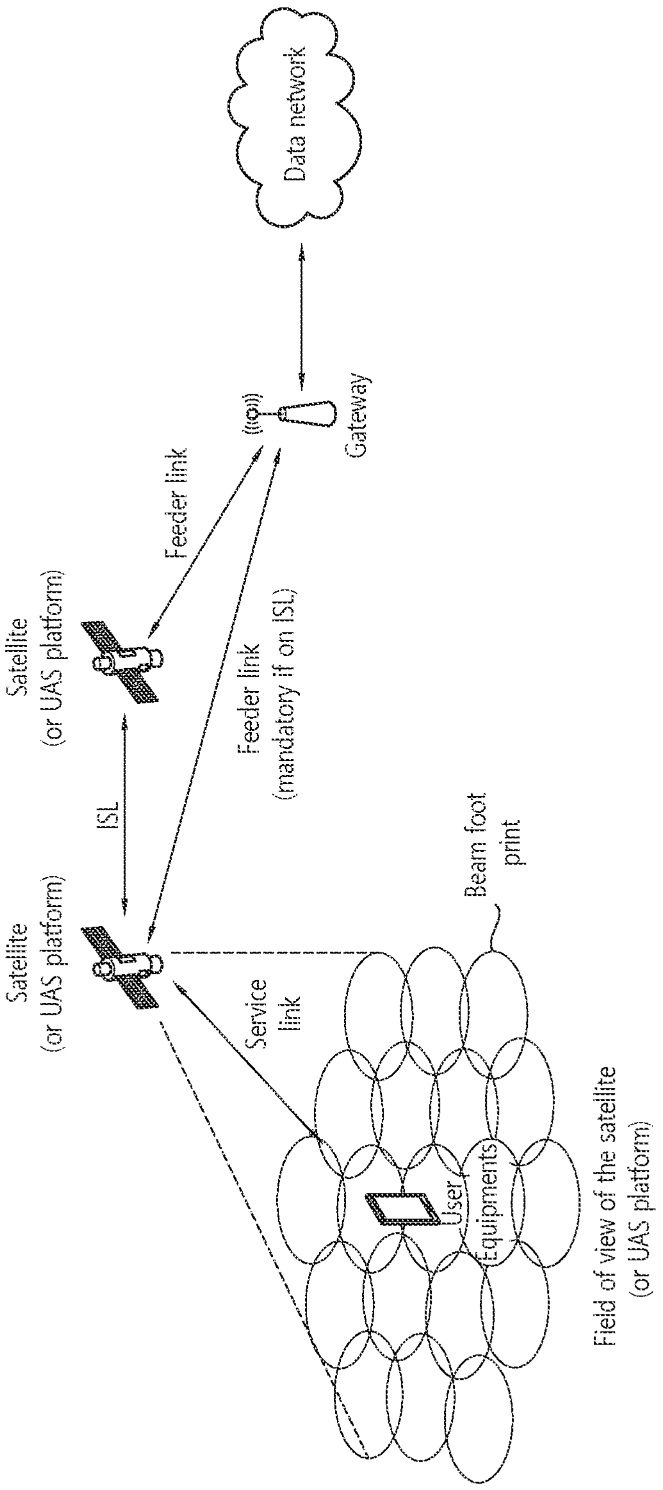
FIG. 11 shows Non-terrestrial network typical scenario based on regenerative payload to which implementations of the present disclosure is applied.

The typical scenario of a non-terrestrial network providing access to user equipment is depicted in FIGS. 10 and 11 shows.

FIG. 10 shows Non-terrestrial network typical scenario based on transparent payload to which implementations of the present disclosure is applied.

FIG. 11 shows Non-terrestrial network typical scenario based on regenerative payload to which implementations of the present disclosure is applied.

Non-Terrestrial Network typically features the following elements:

- One or several sat-gateways that connect the Non-Terrestrial Network to a public data network
- a GEO satellite is fed by one or several sat-gateways which are deployed across the satellite targeted coverage (e.g. regional or even continental coverage). We assume that UE in a cell are served by only one sat-gateway
- A Non-GEO satellite served successively by one or several sat-gateways at a time. The system ensures service and feeder link continuity between the successive serving sat-gateways with sufficient time duration to proceed with mobility anchoring and hand-over
- A Feeder link or radio link between a sat-gateway and the satellite (or UAS platform)
- A service link or radio link between the user equipment and the satellite (or UAS platform).
- A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.
- A transparent payload: Radio Frequency filtering. Frequency conversion and amplification. Hence, the waveform signal repeated by the payload is un-changed;
- A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).
- Inter-satellite links (ISL) optionally in case of a constellation of satellites. This will require regenerative payloads on board the satellites. ISL may operate in RF frequency or optical bands.
- User Equipment are served by the satellite (or UAS platform) within the targeted service area.

There may be different types of satellites (or UAS platforms).

Typically,

- GEO satellite and UAS are used to provide continental, regional or local service.
- a constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

Non-Terrestrial Networks reference scenarios

Non-terrestrial networks provides access to user equipment in six reference scenarios including Circular orbiting and notional station keeping platforms.

Highest RTD constraint

Highest Doppler constraint

A transparent and a regenerative payload

One ISL case and one without ISL. Regenerative payload is mandatory in the case of inter-satellite links.

Fixed or steerable beams resulting respectively in moving or fixed beam foot print on the ground In NR, the following technical features could be applied to some embodiments of the present disclosure.

Broadcast of cell stop time in SIB is applicable to a quasi-earth fixed cell (not to a moving cell).

For a quasi-earth fixed cell, the reference location of the cell (serving cell or the neighbor cells) is broadcast in system information.

For a quasi-earth fixed cell, UE should start measurements on neighbor cells before the serving cell stops covering the current area.

For a quasi-earth fixed cell, the broadcast "timing information on when a cell is going to stop serving the area" refers to the time when a cell stops covering the current area.

For a quasi-earth fixed cell, specify that UE should start measurements on neighbor cells before the broadcast stop time of the serving cell, i.e. the time when the serving cell stops covering the current area, and the exact time to start measurements is up to UE implementation.

Location assisted cell reselection, with the distance between UE and the reference location of the cell (serving cell and/or neighbor cell) taken into account, is supported for quasi-earth fixed cell, if UE has valid location information, which means location acquisition will not be triggered at UE side only for location assisted cell reselection.

Herein, technical features related to the non-terrestrial networks are described.

Non-terrestrial networks refer to networks, or segments of networks, using an airborne or spaceborne vehicle for transmission:

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

Use cases for 5G Satellite integration and the corresponding service requirements have been identified. This will address mobile broadband needs in unserved/underserved areas as well as public safety needs, maritime (Maritime communication services over 3GPP system), airplane connectivity and railway communication service requirements applicable to satellite access.

It may be aimed to specify the enhancements identified for NR NTN (non-terrestrial networks) especially LEO and GEO with implicit compatibility to support HAPS (high altitude platform station) and ATG (air to ground) scenarios according to the following principles:

FDD is assumed for core specification work for NR-NTN.

This does not imply that TDD cannot be used for relevant scenarios e.g. HAPS. ATG Earth fixed Tracking area is assumed with Earth fixed and moving cells UEs with GNSS capabilities are assumed.

Transparent payload is assumed.

Hereinafter, technical features related to cell selection and reselection are described. Section 5.2 of 3GPP TS 38.304 v 15.7.0 may be referred.

UE shall perform measurements for cell selection and reselection purposes.

When evaluating Srxlev and Squal of non-serving cells for reselection evaluation purposes, the UE shall use parameters provided by the serving cell and for the final check on cell selection criterion, the UE shall use parameters provided by the target cell for cell reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several RATs, if available, may be used by the UE.

When camped on a cell, the UE shall regularly search for a better cell according to the cell reselection criteria. If a better cell is found, that cell is selected. The change of cell may imply a change of RAT.

The NAS is informed if the cell selection and reselection result in changes in the received system information relevant for NAS.

For normal service, the UE shall camp on a suitable cell, monitor control channel(s) of that cell so that the UE can:

receive system information from the PLMN; and receive registration area information from the PLMN, e.g., tracking area information; and receive other AS and NAS Information; and if registered:

receive paging and notification messages from the PLMN; and initiate transfer to Connected mode.

For cell selection in multi-beam operations, measurement quantity of a cell is up to UE implementation.

For cell reselection in multi-beam operations, including inter-RAT reselection from E-UTRA to NR, the measurement quantity of this cell is derived amongst the beams corresponding to the same cell based on SS/PBCH block as follows:

if nrofSS-BlocksToAverage (maxRS-IndexCellQual in E-UTRA) is not configured in SIB2/SIB4 (SIB24 in E-UTRA); or if absThreshSS-BlocksConsoldation (threshRS-Index in E-UTRA) is not configured in SIB2 SIB4 (SIB24 in E-UTRA); or if the highest beam measurement quantity value is below or equal to absThreshSS-BlocksConsolidation (threshRS-Index in E-UTRA):

derive a cell measurement quantity as the highest beam measurement quantity value.

else:

derive a cell measurement quantity as the linear average of the power values of up to nrofSS-BlocksToAverage (maxRS-IndexCellQual in E-UTRA) of highest beam measurement quantity values above absThreshSS-BlocksConsolidation (threshRS-Index in E-UTRA).

States and state transitions in RRC_IDLE state and RRC_INACTIVE state are described.

Figure 12:
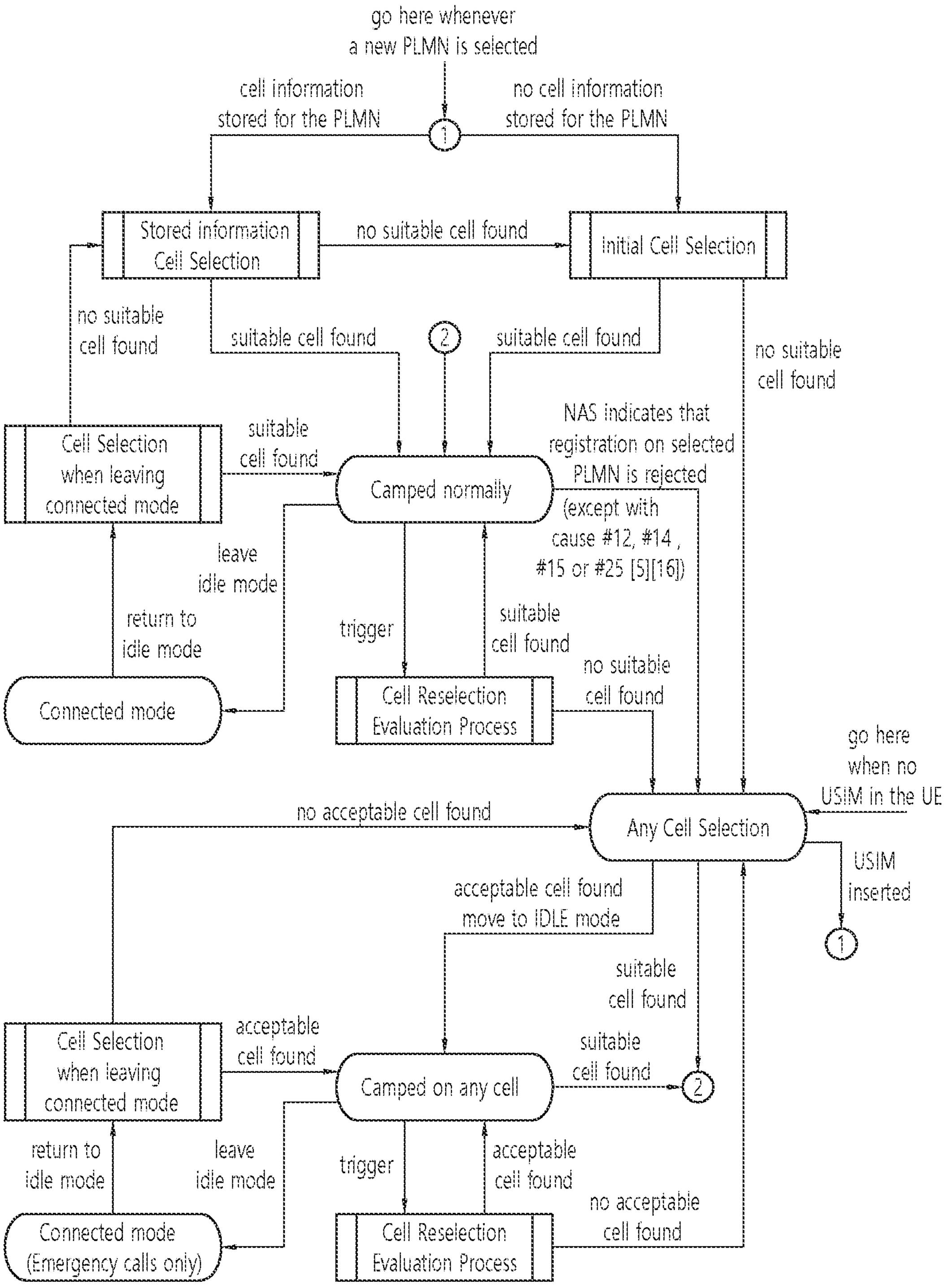
FIG. 12 shows the states and state transitions and procedures in RRC_IDLE and RRC_INACTIVE.

FIG. 12 shows the states and state transitions and procedures in RRC_IDLE and RRC_INACTIVE.

Whenever a new PLMN selection or new SNPN selection is performed, it causes an exit to number 1.

Cell selection is performed by one of the following two procedures.

a) Initial cell selection (no prior knowledge of which RF channels are NR frequencies):

1. The UE shall scan all RF channels in the NR bands according to its capabilities to find a suitable cell.
2. On each frequency, the UE need only search for the strongest cell, except for operation with shared spectrum channel access where the UE may search for the next strongest cell(s).
3. Once a suitable cell is found, this cell shall be selected.

b) Cell selection by leveraging stored information:

1. This procedure requires stored information of frequencies and optionally also information on cell parameters from previously received measurement control information elements or from previously detected cells.
2. Once the UE has found a suitable cell, the UE shall select it.
3. If no suitable cell is found, the initial cell selection procedure in a) shall be started.

Priorities between different frequencies or RATs provided to the UE by system information or dedicated signalling are not used in the cell selection process.

Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values). If the UE is configured to perform both NR sidelink communication and V2X sidelink communication, the UE may consider the frequency providing both NR sidelink communication configuration and V2X sidelink communication configuration to be the highest priority. If the UE is configured to perform NR sidelink communication and not perform V2X communication, the UE may consider the frequency providing NR sidelink communication configuration to be the highest priority. If the UE is configured to perform V2X sidelink communication and not perform NR sidelink communication, the UE may consider the frequency providing V2X sidelink communication configuration to be the highest priority.

The frequency only providing the anchor frequency configuration should not be prioritized for V2X service during cell reselection.

When UE is configured to perform NR sidelink communication or V2X sidelink communication performs cell reselection, it may consider the frequencies providing the intra-carrier and inter-carrier configuration have equal priority in cell reselection.

The prioritization among the frequencies which UE considers to be the highest priority frequency is left to UE implementation.

The UE is configured to perform V2X sidelink communication or NR sidelink communication, if it has the capability and is authorized for the corresponding sidelink operation.

When UE is configured to perform both NR sidelink communication and V2X sidelink communication, but cannot find a frequency which can provide both NR sidelink communication configuration and V2X sidelink communication configuration, UE may consider the frequency providing either NR sidelink communication configuration or V2X sidelink communication configuration to be the highest priority.

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e. lower than any of the network configured values) while T325 is running irrespective of camped RAT. The UE shall delete the stored deprioritisation request(s) when a PLMN selection or SNPN selection is performed on request by NAS.

UE should search for a higher priority layer for cell reselection as soon as possible after the change of priority.

The UE shall delete priorities provided by dedicated signalling when:

- the UE enters a different RRC state: or
- the optional validity time of dedicated priorities (T320) expires; or
- the UE receives an RRCRelease message with the field cellReselectionPriorties absent; or
- a PLMN selection or SNPN selection is performed on request by NAS.

Equal priorities between RATs are not supported.

The UE shall not consider any black listed cells as candidate for cell reselection.

The UE shall consider only the white listed cells, if configured, as candidates for cell reselection.

The UE in RRC_IDLE state shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

Measurement rules for cell re-selection are described.

Following rules are used by the UE to limit needed measurements:

- if the serving cell fulfils Srxlev>$S_{IntraSearchP}$ and Squal>$S_{IntraSearchQ}$, the UE may choose not to perform intra-frequency measurements.
- Otherwise, the UE shall perform intra-frequency measurements.
- The UE shall apply the following rules for NR inter-frequencies and inter-RAT frequencies which are indicated in system information:
- For a NR inter-frequency or inter-RAT frequency with a reselection priority higher than the reselection priority of the current NR frequency, the UE shall perform measurements of higher priority NR inter-frequency or inter-RAT frequencies.

For a NR inter-frequency with an equal or lower reselection priority than the reselection priority of the current NR frequency and for inter-RAT frequency with lower reselection priority than the reselection priority of the current NR frequency:

If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority.

if the UE supports relaxed measurement and relaxedMeasurement is present in SIB2, the UE may further relax the needed measurements.

Mobility states of a UE are described.

The UE mobility state is determined if the parameters ($T_{CRmax}$, $N_{CR\_H}$, $N_{CR\_M}$ and $T_{CRmaxHyst}$) are broadcasted in system information for the serving cell.

State Detection Criteria:

Normal-Mobility State Criteria

If number of cell reselections during time period $T_{CRmax}$ is less than $N_{CR\_M}$.

Medium-Mobility State Criteria:

If number of cell reselections during time period $T_{CRmax}$ is greater than or equal to $N_{CR\_M}$ but less than or equal to $N_{CR\_H}$.

High-Mobility State Criteria:

If number of cell reselections during time period $T_{CRmax}$ is greater than $N_{CR\_H}$.

The UE shall not consider consecutive reselections where a cell is reselected again right after one reselection for mobility state detection criteria.

State Transitions:

The UE Shall:

if the criteria for High-mobility state is detected:

enter High-mobility state.

else if the criteria for Medium-mobility state is detected:

enter Medium-mobility state.

else if criteria for either Medium- or High-mobility state is not detected during time period $T_{CRmaxHyst}$:

enter Normal-mobility state.

If the UE is in High- or Medium-mobility state, the UE shall apply the speed dependent scaling rules.

Relaxed measurement rules are described.

When the UE is required to perform measurements of intra-frequency or NR inter-frequencies or inter-RAT frequency cells:

if lowMobilityEvaluation is configured and cellEdgeEvaluation is not configured; and if the UE has performed normal intra-frequency. NR inter-frequency, or inter-RAT frequency measurements for at least $T_{SearchDeltaP}$ after (re-)selecting a new cell; and if the relaxed measurement criterion is fulfilled for a period of $T_{SearchDeltaP}$:

the UE may choose to perform relaxed measurements for intra-frequency cells according to relaxation methods;

if the serving cell fulfils Srxlev>$S_{nonIntraSearchP}$ and Squal>$S_{nonIntraSearchQ}$:

for any NR inter-frequency or inter-RAT frequency of higher priority, if less than 1 hour has passed since measurements of corresponding frequency cell(s) for cell (re-)selection were last performed; and, if highPriorityMeasRelax is configured with value true:

the UE may choose not to perform measurement on this frequency cell(s);

else (i.e. the serving cell fulfils Srxlev≤$S_{nonItraSearchP}$ or Squal≤$S_{nonIntraSearchQ}$):

the UE may choose to perform relaxed measurements for NR inter-frequency or inter-RAT frequency cells;

if cellEdgeEvaluation is configured and lowMobilityEvaluation is not configured; and if the relaxed measurement criterion is fulfilled:

the UE may choose to perform relaxed measurements for intra-frequency cells according to relaxation methods;

if the serving cell fulfils Srxlev≤$S_{nonIntraSearchP}$ or Squal≤$S_{nonIntraSearchQ}$:

the UE may choose to perform relaxed measurements for NR inter-frequency or inter-RAT frequency cells;

if both lowMobilityEvaluation and cellEdgeEvaluation are configured:

if the UE has performed normal intra-frequency, NR inter-frequency, or inter-RAT frequency measurements for at least $T_{SearchDeltaP}$ after (re-)selecting a new cell; and if the relaxed measurement criterion is fulfilled for a period of $T_{SearchDeltaP}$; and if the relaxed measurement criterion is fulfilled:

for any intra-frequency, NR inter-frequency, or inter-RAT frequency, if less than 1 hour has passed since measurements of corresponding frequency cell(s) for cell (re-)selection were last performed:

the UE may choose not to perform measurement for measurements on this frequency cell(s);

else:

if the UE has performed normal intra-frequency, NR inter-frequency, or inter-RAT frequency measurements for at least $T_{SearchDeltaP}$ after (re-)selecting a new cell, and the relaxed measurement criterion is fulfilled for a period of $T_{SearchDeltaP}$; or, if the relaxed measurement criterion is fulfilled;

if combineRelaxedMeasCondition is not configured;

the UE may choose to perform relaxed measurements for intra-frequency. NR inter-frequency cells of equal or lower priority, or inter-RAT frequency cells of equal or lower priority;

if the serving cell fulfils Srxlev≤$S_{nonIntraSearchP}$ or Squal≤$S_{nonIntraSearchQ}$:

the UE may choose to perform relaxed measurement for NR inter-frequency cells of higher priority, or inter-RAT frequency cells of higher priority;

The above relaxed measurements and no measurement are not applicable for frequencies that are included in VarMeasIdleConfig, if configured and for which the UE supports dual connectivity or carrier aggregation between those frequencies and the frequency of the current serving cell.

Meanwhile, UE could be allowed to skip the measurements on neighbour cells while the remaining service time (that is, RST) of the serving cell is larger than a threshold.

However, though the RST of the serving cell is large enough, UE may need to measure TN cells. Thus, the UE can reselect a TN cell that can provide more robust radio link with shorter latency than the NTN cell.

Therefore, studies for operations based on remaining service time in a wireless communication system are required.

Hereinafter, a method for operations based on remaining service time in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
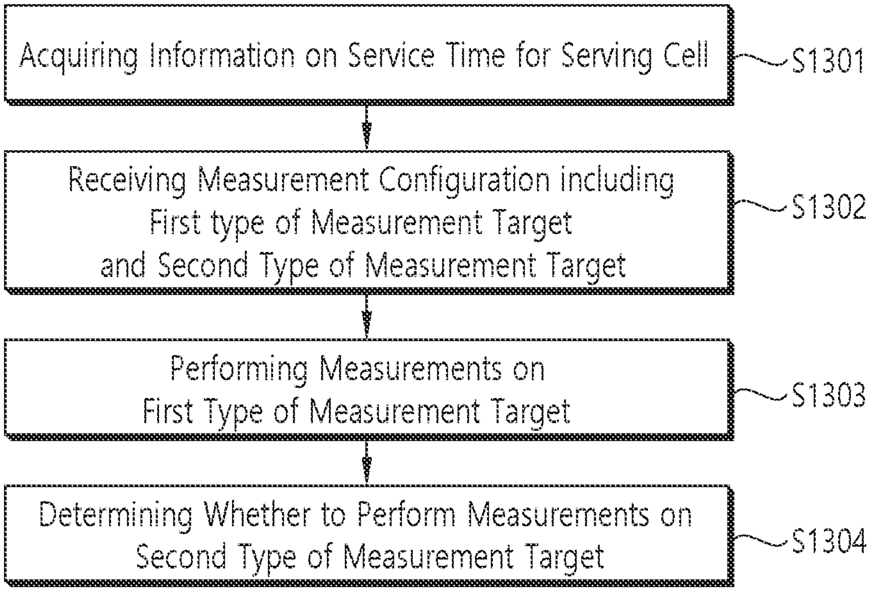
FIG. 13 shows an example of a method for operations based on remaining service time in a wireless communication system, according to some embodiments of the present disclosure.

FIG. 13 shows an example of a method for operations based on remaining service time in a wireless communication system, according to some embodiments of the present disclosure.

In particular, FIG. 13 shows an example of a method performed by a wireless device.

In step S1301, a wireless device may acquire information on a service time for a serving cell.

For example, the serving cell may be a Non-Terrestrial Network (NTN) cell. For example, the serving cell may be an earth fixed NTN cell.

For example, there may be two types of NTN cells. For example, a Non-Terrestrial Network (NTN) may include earth fixed cells and earth moving cells. Compared to LEO based Earth moving cells scenario where cells are moving on the ground, LEO based Earth fixed cells scenario refer to NTN that provide cells fixed with respect to a certain location on the Earth during a certain time duration. This can be achieved with NTN platforms generating steerable beams which footprint is fixed on the ground.

For example, the wireless device may receive information on the service time of the serving cell from the network (for example, from the serving cell). For example, the network may transmit system information block type 19 (SIB19) including the service time of the serving cell.

For example, the SIB19 may contain satellite assistance information. For example, the SIB19 may include information on (i) distanceThresh, (ii) ntn-Config, (iii) ntn-NeighCellConfigList, (iv) referenceLocation, and (v) t-Service.

For example, distanceThresh may indicate distance from the serving cell reference location and may be used in location-based measurement initiation in RRC_IDLE and RRC_INACTIVE. For example, each step may represent 50 m.

For example, ntn-Config may provide parameters needed for the UE to access NR via NTN access such as Ephemeris data, common TA parameters, k_offset, validity duration for UL sync information and epoch. The validity duration, ntn-UISyncValidityDuration, may be mandatory present.

For example, ntn-NeighCellConfigList may provide a list of NTN neighbour cells including their ntn-Config, carrier frequency and PhysCellId.

For example, referenceLocation may indicate reference location of the serving cell provided via NTN quasi-Earth fixed system and may be used in location-based measurement initiation in RRC_IDLE and RRC_INACTIVE.

For example, t-Service may indicate the time information on when a cell provided via NTN quasi-Earth fixed system is going to stop serving the area it is currently covering. For example, this field may indicate a time in multiples of 10 ms after 00:00:00 on Gregorian calendar date 1 Jan. 1900 (midnight between Sunday, Dec. 31, 1899 and Monday, Jan. 1, 1900). This field may be excluded when determining changes in system information, that is, changes of t-Service should neither result in system information change notifications nor in a modification of valueTag in SIB1. The exact stop time may be between the time indicated by the value of this field minus 1 and the time indicated by the value of this field.

According to some embodiments of the present disclosure, if the t-Service of the serving cell is present in SIB19, a wireless device (for example, UE) shall perform intra-frequency, inter-frequency or inter-RAT measurements before the t-Service, regardless of the distance between UE and the serving cell reference location or whether the serving cell fulfils Srxlev>SIntraSearchP and Squal>SlntraSearchQ, or Srxlev>SnonIntraSearchP and Squal>SnonIntraSearchQ and the exact time to start measurement before t-Service is up to UE implementation. For example, UE shall perform measurements of higher priority NR inter-frequency or inter-RAT frequencies regardless of the remaining service time of the serving cell (that is, time remaining until t-Service).

In step S1302, a wireless device may receive, from the serving cell, a measurement configuration including a first type of a measurement target and a second type of a measurement target.

The first type of a measurement target may include (i) a Terrestrial Network (TN) cell or (ii) a frequency including one or more TN cells. That is, all cells included in the first type of the measurement target may be the TN cells. All frequencies included in the first type of the measurement target may be the frequencies including one or more TN cells.

The second type of a measurement target may include (i) a Non-Terrestrial Network (NTN) cell or (ii) a frequency including NTN cells only. That is, all cells included in the second type of the measurement target may be the NTN cells. All frequencies included in the second type of the measurement target may be the frequencies including only NTN cells.

For example, the measurement configuration may include (i) one or more measurement targets and (ii) one or more indications informing each type of one or more measurement targets. That is, the measurement configuration may include (i) information on one or more cells and/or one or more frequencies as the measurement targets and (ii) information on the type of the each cells and/or frequencies.

For example, the measurement configuration may include information informing whether to perform the measurements on the second type of the measurement target while the remaining service time of the serving cell is larger than a threshold.

That is, the measurement configuration may include an indication indicating to skip the measurements on the second type of the measurement target while the remaining service time of the serving cell is larger than a threshold.

For example, the measurement configuration may include information on the threshold.

In step S1303, a wireless device may perform measurements on the first type of the measurement target.

For example, the wireless device may perform the measurement on the first type of the measurement target, regardless of the remaining service time of the serving cell.

In step S1304, a wireless device may determine whether to perform measurements on the second type of the measurement target, based on the information on the service time of the serving cell.

For example, the wireless device may calculate a remaining service time based on the information on the service time for the serving cell.

For other example, the network may provide information on the remaining service time of the serving cell. Then, the wireless device may acquire information on a remaining service time of the serving cell from a network.

According to some embodiments of the present disclosure, the wireless device may skip measurements on the second type of the measurement target, based on a remaining service time of the serving cell being larger than a threshold.

Otherwise, the wireless device may perform measurements on the second type of the measurement target, based on a remaining service time of the serving cell being smaller than or equal to a threshold.

Alternatively, the wireless device may skip measurements on the second type of the measurement target, based on a remaining service time of the serving cell being larger than or equal to a threshold.

Otherwise, the wireless device may perform measurements on the second type of the measurement target, based on a remaining service time of the serving cell being smaller than a threshold.

For example, the threshold may be configured by a network as a fixed value. Otherwise, the threshold may be configured by the wireless device a fixed value.

According to some embodiments of the present disclosure, the wireless device may be in communication with at least one of a user equipment, a network, or an autonomous vehicle other than the wireless device.

Hereinafter, technical features related to measurements and mobility based on remaining service time in a wireless communication system are described.

If the remaining service time (that is, RST) of the serving cell is larger than a threshold, UE may perform measurements on the first type of measurement targets, and may choose not to perform measurements on the second type of measurement targets.

If the RST of the serving cell is smaller than a threshold, UE may perform measurements on the first type and second type of measurement targets.

While the RST of the serving cell is larger than a threshold, UE may skip measurements on the second type of measurement targets.

UE may start the measurements on the second type of measurement targets, if the RST of the serving cell becomes equal to a threshold. UE may start the measurements on the second type of measurement targets, if the RST of the serving cell becomes smaller than a threshold.

If the RST of the serving cell is larger than a threshold, UE may not consider cells that belongs to the second type of measurement target as candidates for cell resection.

If the RST of the serving cell is smaller than a threshold, UE may consider cells that belongs to the second type of measurement target as candidates for cell resection.

For example, the threshold may be set by network to a fixed value.

UE may receive a measurement configuration including the measurement target(s). The measurement target may be divided into two types, that is, the first type of measurement target and the second type of measurement target. The first type of measurement target may be a TN cell or a frequency comprising TN cell(s) only, or a frequency including TN cell(s). The second type of measurement target may be a NTN cell or a frequency comprising NTN cell(s) only.

For example, in the measurement configuration, for each measurement target, an indication may be included to indicate the type of measurement target. If the RST is provided for a measurement target, UE may consider the measurement target belongs to the second type. If the RST is not provided for a measurement target, UE may consider the measurement target belongs to the first type.

For example, the measurement configuration may include an indication indicating whether UE can skip the measurements on the second type of measurement target while the RST of the serving cell is larger than a threshold.

For example, the RST may be the remaining time that UE can be provided with service on the cell normally. The RST of serving cell and/or neighbour cell(s) may be provided to UE by network. UE may calculate the RST of the serving cell while camping on the cell.

Figure 14:
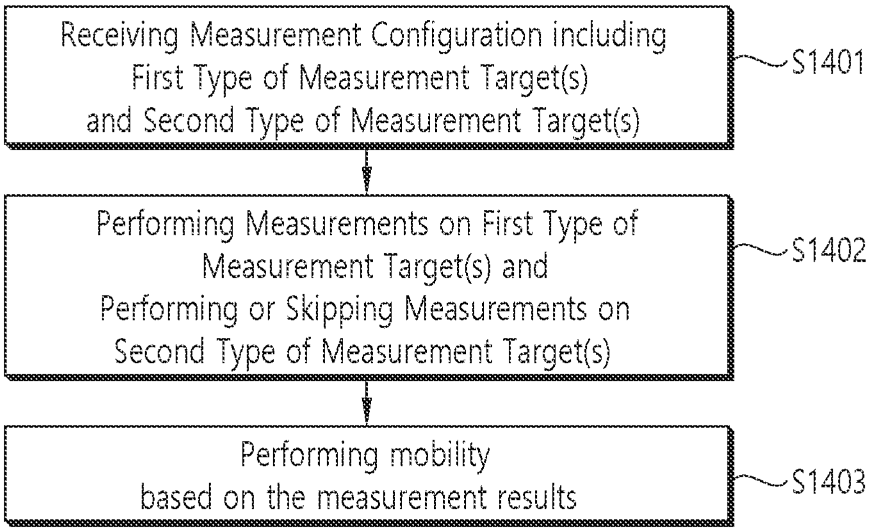
FIG. 14 shows an example of UE operations for measurement and mobility based on remaining service time in a wireless communication system, according to some embodiments of the present disclosure.

FIG. 14 shows an example of UE operations for measurement and mobility based on remaining service time in a wireless communication system, according to some embodiments of the present disclosure.

In step S1401, UE may receive a measurement configuration including the first type of measurement target(s) and the second type of measurement target(s). The first type of measurement target may be a TN cell or a frequency including TN cell(s). The second type of measurement target may be a NTN cell or a frequency including NTN cells only.

In step S1402, UE may perform measurements on the first type of measurement target(s) and the second type of measurement target(s), if the remaining service time of the serving cell is smaller than or equal to a threshold.

Alternatively, in step S1402, UE may perform measurements on the first type of measurement target(s) and skip measurements on the second type of measurement target(s), if the remaining service time of the serving cell is larger than a threshold.

In step S1403, UE may perform mobility based on the measurement results.

Figure 15:
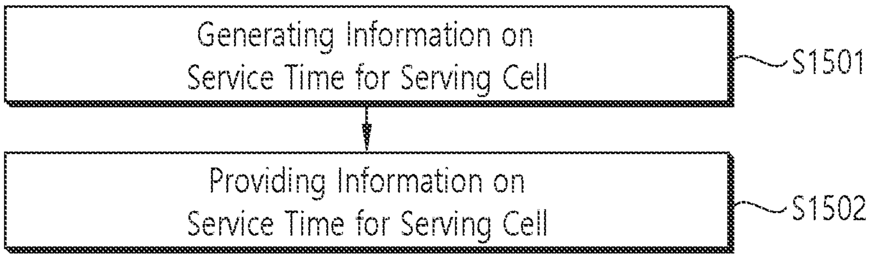
FIG. 15 shows an example of operations of a base station for measurement and mobility based on remaining service time in a wireless communication system, according to some embodiments of the present disclosure.

FIG. 15 shows an example of operations of a base station for measurement and mobility based on remaining service time in a wireless communication system, according to some embodiments of the present disclosure.

For example, the base station may be a satellite providing a Non-Terrestrial Network (NTN) cell as a serving cell for one or more wireless devices. For example, the base station may be a satellite providing an earth fixed NTN cell as a serving cell for one or more wireless devices.

In step S1501, the base station may generate information on a service time for a serving cell.

In step S1502, the base station may provide the information on the service time for the serving cell to one or more wireless devices.

Some of the detailed steps shown in the examples of FIGS. 13, 14, and 15 may not be essential steps and may be omitted. In addition to the steps shown in FIGS. 13, 14, and 15, other steps may be added, and the order of the steps may vary. Some of the above steps may have their own technical meaning.

Hereinafter, an apparatus for operations based on remaining service time in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to acquire information on a service time for a serving cell. The processor 102 may be configured to control the transceiver 106 to receive, from the serving cell, a measurement configuration including a first type of a measurement target and a second type of a measurement target. The first type of a measurement target may include (i) a Terrestrial Network (TN) cell or (ii) a frequency including one or more TN cells, and the second type of a measurement target may include (i) a Non-Terrestrial Network (NTN) cell or (ii) a frequency including NTN cells only. The processor 102 may be configured to perform measurements on the first type of the measurement target. The processor 102 may be configured to determine whether to perform measurements on the second type of the measurement target, based on the information on the service time of the serving cell.

The processor 102 may be configured to calculate a remaining service time based on the information on the service time for the serving cell.

The processor 102 may be configured to skip measurements on the second type of the measurement target, based on a remaining service time of the serving cell being larger than a threshold.

The processor 102 may be configured to perform measurements on the second type of the measurement target, based on a remaining service time of the serving cell being smaller than or equal to a threshold.

For example, the threshold may be configured by a network as a fixed value.

For example, the serving cell may be an NTN cell.

For example, the serving cell may be an earth fixed NTN cell.

For example, the measurement configuration may include (i) one or more measurement targets and (ii) one or more indications informing each type of one or more measurement targets.

For example, the measurement configuration may include information informing whether to perform the measurements on the second type of the measurement target while the remaining service time of the serving cell is larger than a threshold.

According to some embodiments of the present disclosure, the processor 102 may be configured to acquire information on a remaining service time of the serving cell from a network.

According to some embodiments of the present disclosure, the processor 102 may be configured to skip measurements on the second type of the measurement target, based on a remaining service time of the serving cell being larger than or equal to a threshold. The processor 102 may be configured to perform measurements on the second type of the measurement target, based on a remaining service time of the serving cell being smaller than a threshold.

According to some embodiments of the present disclosure, the processor 102 may be configured to be in communication with at least one of a user equipment, a network, or an autonomous vehicle other than the wireless device.

Hereinafter, a processor for a wireless device for operations based on remaining service time in a wireless communication system, according to some embodiments of the present disclosure, will be described.

The processor may be configured to control the wireless device to acquire information on a service time for a serving cell. The processor may be configured to control the wireless device to receive, from the serving cell, a measurement configuration including a first type of a measurement target and a second type of a measurement target. The first type of a measurement target may include (i) a Terrestrial Network (TN) cell or (ii) a frequency including one or more TN cells, and the second type of a measurement target may include (i) a Non-Terrestrial Network (NTN) cell or (ii) a frequency including NTN cells only. The processor may be configured to control the wireless device to perform measurements on the first type of the measurement target. The processor may be configured to control the wireless device to determine whether to perform measurements on the second type of the measurement target, based on the information on the service time of the serving cell.

The processor may be configured to control the wireless device to calculate a remaining service time based on the information on the service time for the serving cell.

The processor may be configured to control the wireless device to skip measurements on the second type of the measurement target, based on a remaining service time of the serving cell being larger than a threshold.

The processor may be configured to control the wireless device to perform measurements on the second type of the measurement target, based on a remaining service time of the serving cell being smaller than or equal to a threshold.

For example, the threshold may be configured by a network as a fixed value.

For example, the serving cell may be an NTN cell.

For example, the serving cell may be an earth fixed NTN cell.

For example, the measurement configuration may include (i) one or more measurement targets and (ii) one or more indications informing each type of one or more measurement targets.

For example, the measurement configuration may include information informing whether to perform the measurements on the second type of the measurement target while the remaining service time of the serving cell is larger than a threshold.

According to some embodiments of the present disclosure, the processor may be configured to control the wireless device to acquire information on a remaining service time of the serving cell from a network.

According to some embodiments of the present disclosure, the processor may be configured to control the wireless device to skip measurements on the second type of the measurement target, based on a remaining service time of the serving cell being larger than or equal to a threshold. The processor may be configured to control the wireless device to perform measurements on the second type of the measurement target, based on a remaining service time of the serving cell being smaller than a threshold.

According to some embodiments of the present disclosure, the processor may be configured to control the wireless device to be in communication with at least one of a user equipment, a network, or an autonomous vehicle other than the wireless device.

Hereinafter, anon-transitory computer-readable medium has stored thereon a plurality of instructions for operations based on remaining service time in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to acquire information on a service time for a serving cell. The stored a plurality of instructions may cause the wireless device to receive, from the serving cell, a measurement configuration including a first type of a measurement target and a second type of a measurement target. The first type of a measurement target may include (i) a Terrestrial Network (TN) cell or (ii) a frequency including one or more TN cells, and the second type of a measurement target may include (i) a Non-Terrestrial Network (NTN) cell or (ii) a frequency including NTN cells only. The stored a plurality of instructions may cause the wireless device to perform measurements on the first type of the measurement target. The stored a plurality of instructions may cause the wireless device to determine whether to perform measurements on the second type of the measurement target, based on the information on the service time of the serving cell.

The stored a plurality of instructions may cause the wireless device to calculate a remaining service time based on the information on the service time for the serving cell.

The stored a plurality of instructions may cause the wireless device to skip measurements on the second type of the measurement target, based on a remaining service time of the serving cell being larger than a threshold.

The stored a plurality of instructions may cause the wireless device to perform measurements on the second type of the measurement target, based on a remaining service time of the serving cell being smaller than or equal to a threshold.

For example, the threshold may be configured by a network as a fixed value.

For example, the serving cell may be an NTN cell.

For example, the serving cell may be an earth fixed NTN cell.

For example, the measurement configuration may include (i) one or more measurement targets and (ii) one or more indications informing each type of one or more measurement targets.

For example, the measurement configuration may include information informing whether to perform the measurements on the second type of the measurement target while the remaining service time of the serving cell is larger than a threshold.

According to some embodiments of the present disclosure, the stored a plurality of instructions may cause the wireless device to acquire information on a remaining service time of the serving cell from a network.

According to some embodiments of the present disclosure, the stored a plurality of instructions may cause the wireless device to skip measurements on the second type of the measurement target, based on a remaining service time of the serving cell being larger than or equal to a threshold. The stored a plurality of instructions may cause the wireless device to perform measurements on the second type of the measurement target, based on a remaining service time of the serving cell being smaller than a threshold.

According to some embodiments of the present disclosure, the stored a plurality of instructions may cause the wireless device to be in communication with at least one of a user equipment, a network, or an autonomous vehicle other than the wireless device.

Hereinafter, a base station (BS) for operations based on remaining service time in a wireless communication system, according to some embodiments of the present disclosure, will be described.

The BS may include a transceiver, a memory, and a processor operatively coupled to the transceiver and the memory.

The processor may be configured to generate information on a service time for a serving cell. The processor may be configured to control the transceiver to provide the information on the service time for the serving cell to one or more wireless devices.

The present disclosure can have various advantageous effects.

According to some embodiments of the present disclosure, a wireless device could efficiently perform operations based on remaining service time.

For example, the wireless device may perform measurement and/or mobility considering the remaining service time of an NTN cell (for example, an earth fixed cell).

For example, w % bile an UE is camping on an NTN cell, the UE can save its power by skipping the measurements on neighbour NTN cells based on the RST of the serving NTN cell. In addition, the UE can move to a TN cell by performing the measurements on neighbour TN cells regardless of the RST of the serving NTN cell.

For example, power can be saved by reducing unnecessary measurements on NTN cells. That is, if the remaining service time is sufficient, measurement may not be performed on other NTN cells.

According to some embodiments of the present disclosure, a wireless network system could provide an efficient solution for operations considering the remaining service time of an NTN cell.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method, comprising, acquiring, by a wireless device, information on a service time for a serving cell, wherein the serving cell is a non-terrestrial network cell;

receiving, by the wireless device, a measurement configuration, wherein the measurement configuration includes (i) information related to one or more measurement targets, (ii) indications informing whether each measurement target is either a first type of measurement target or a second type of measurement target, and (iii) information informing that measurements for the second type of measurement target are not needed while a remaining service time of the serving cell is larger than a threshold, wherein the first type of measurement target includes (i) a terrestrial network cell or (ii) a frequency including one or more terrestrial network cells, and wherein the second type of a measurement target includes (i) a non-terrestrial network cell or (ii) a frequency including one or more non-terrestrial network cells only;

calculating, by the wireless device, the remaining service time of the serving cell based on the information on the service time for the serving cell; and determining, by the wireless device, whether to perform measurements for at least one second type of the measurement target, based on the remaining service time of the serving cell;

based on the remaining service time of the serving cell being larger than a threshold:

performing, by the wireless device, measurements only for the first type of the measurement target; and skipping, by the wireless device, measurements for the second type of the measurement target, based on the remaining service time of the serving cell being smaller than or equal to the threshold:

performing, by the wireless device, measurements for both the first type of the measurement target and the second type of the measurement target.

2. The method of claim 1, wherein the threshold is configured by a network as a fixed value.

3. The method of claim 1, wherein the serving cell is an earth fixed non-terrestrial network cell.

4. The method of claim 1, wherein the wireless device is in communication with at least one of a user equipment, a network, or an autonomous vehicle other than the wireless device.

5. A wireless device, comprising:

a transceiver;

a memory; and at least one processor operatively coupled to the transceiver and the memory, and configured to perform operations, the operations comprising:

acquiring information on a service time for a serving cell, wherein the serving cell is a non-terrestrial network cell;

receiving a measurement configuration, wherein the measurement configuration includes (i) information related to one or more measurement targets, (ii) indications informing whether each measurement target is either a first type of measurement target or a second type of measurement target, and (iii) information informing that measurements for the second type of measurement target are not needed while a remaining service time of the serving cell is larger than a threshold, wherein the first type of measurement target includes (i) a terrestrial network cell or (ii) a frequency including one or more terrestrial network cells, and wherein the second type of a measurement target includes (i) a non-terrestrial network cell or (ii) a frequency including one or more non-terrestrial network cells only:

calculating the remaining service time of the serving cell based on the information on the service time for the serving cell; and determining whether to perform measurements for at least one second type of the measurement target, based on the remaining service time of the serving cell;

based on the remaining service time of the serving cell being larger than a threshold:

performing measurements only for the first type of the measurement target; and skipping measurements for the second type of the measurement target, based on the remaining service time of the serving cell being smaller than or equal to the threshold:

performing measurements for both the first type of the measurement target and the second type of the measurement target.

6. The wireless device of claim 5, wherein the threshold is configured by a network as a fixed value.

* * * * *